(12) United States Patent
Nishi

(10) Patent No.: US 6,876,622 B2
(45) Date of Patent: Apr. 5, 2005

(54) ANAMORPHIC PRISM, OPTICAL HEAD AND OPTICAL RECORDING/ REPRODUCTION DEVICE

(75) Inventor: Noriaki Nishi, Tokyo (JP)

(73) Assignee: Sony Corporation, Tokyo (JP)

( * ) Notice: Subject to any disclaimer, the term of this patent is extended or adjusted under 35 U.S.C. 154(b) by 670 days.

(21) Appl. No.: 09/837,439

(22) Filed: Apr. 18, 2001

(65) Prior Publication Data

US 2002/0034149 A1 Mar. 21, 2002

(30) Foreign Application Priority Data

Apr. 19, 2000 (JP) ........................................ 2000-123723

(51) Int. Cl.[7] ................................................ G11B 7/00
(52) U.S. Cl. ............................. 369/112.21; 369/112.28; 369/44.23
(58) Field of Search ........................ 369/112.01, 112.21, 369/112.28, 44.23, 44.24, 112.26, 112.23, 112.1

(56) References Cited

U.S. PATENT DOCUMENTS

| | | |
|---|---|---|
| 5,272,685 A | 12/1993 | Ando |
| 5,402,269 A | 3/1995 | Oono et al. |
| 5,477,386 A | 12/1995 | Okuda et al. |
| 5,920,539 A | 7/1999 | Schell et al. |
| 5,978,144 A | 11/1999 | Li et al. |
| 5,999,509 A | 12/1999 | Sugiura et al. |
| 6,038,089 A * | 3/2000 | Maruyama et al. ......... 359/837 |
| 6,567,366 B2 * | 5/2003 | Kim et al. ............. 369/112.21 |

FOREIGN PATENT DOCUMENTS

WO    WO 99 46769    9/1999

* cited by examiner

*Primary Examiner*—Nabil Hindi
(74) *Attorney, Agent, or Firm*—Frommer Lawrence & Haug LLP; William S. Frommer

(57) ABSTRACT

An anamorphic prism according to the invention comprises a first prism 2 made of a first light transmitting material and a second prism 3 made of a second light transmitting material, the first prism and the second prism being bonded together along predetermined respective planes thereof, the light beam entering the first prism being expanded or compressed in a particular direction of cross section of the light beam with a predetermined magnification, the expanded or compressed light beam being let to exit from the second prism 3 and proceed in a direction substantially same as the proceeding direction of the incident light beam entering the first prism 2. There are provided an anamorphic prism that can easily modify the intensity distribution of the light beam on the recording medium and allow the device comprising it to operate for signal recording/reproduction in optimal conditions without significantly increasing the dimensions of the device as well as an optical head and an optical recording/reproduction device comprising such an anamorphic prism that are small and can be manufactured with a high manufacturing efficiency.

9 Claims, 15 Drawing Sheets

ANAMORPHIC PRISM, OPTICAL HEAD AND OPTICAL RECORDING/ REPRODUCTION DEVICE

BACKGROUND OF THE INVENTION

1. Field of the Invention

This invention relates to an anamorphic prism typically adapted to compress or expand the incident light beam in a particular direction of cross section of the beam before letting it exit therefrom, to an optical head using such a prism and also to an optical signal recording/reproduction device using such an optical head.

2. Related Background Art

A variety of optical recording/reproduction devices have been developed in recent years and are currently very popular. However, optical disc devices for signal recording/reproduction are accompanied by the problem that the recording performance of the device can vary depending on the profile of the spot of light formed on the disc. Many optical disc devices are made to comprise an anamorphic prism that can change the magnification of the outgoing light beam relative to the incoming light beam in a particular direction of cross section thereof by compressing or expanding the incident light beam. Normally, a semiconductor laser is used as the light source of such a system and the divergence angle of the beam emitted from the semiconductor laser is about 10 degrees at full-width half maximum (FWHM) in a direction parallel to the pn junction plane ($\theta//$ direction) and about FWHM 20 to 30 degrees in a direction perpendicular to the pn junction plane ($\theta\perp$ direction) (the ratio of the divergence angles, or $\theta\perp/\theta//$ is referred to as aspect ratio). Therefore, without such a conversion of magnification of the emitted beam, the intensity of light can fall dramatically in a peripheral area along the direction corresponding to the $\theta//$ direction to make it no longer possible to reduce the beam diameter. In view of this fact, it is there an ordinary practice that the beam emitted from the semiconductor laser is subjected to a magnification conversion of about 1.4 to 3.0 times to minimize the directional variance in the distribution of intensity of light. For example, since the astigmatism that can be generated in an optical disc device due to the displacement Δ of the light emitting spot from the collimator lens in the forward direction is proportional to $\Delta \times \beta^2$, where $\beta$ is the magnification of conversion, a value slightly smaller than the aspect ratio is normally selected for the magnification of conversion in order to suppress the latter.

Conventionally, an anamorphic prism 101 that is used in an optical disc device is normally prepared by bonding a first prism 102 and a second prism 103 made of respective vitreous materials that different from each other. Prisms of two different vitreous materials are bonded together to produce an anamorphic prism 101 in order to provide the latter with the effect of conversion of magnification and that of "decolorization" and improve the efficiency of manufacturing prisms. The term "decolorization" is used to refer to the effect of preventing the direction of the light beam emitted from the prism from significantly being changed if the wavelength of the light beam striking the prism is shifted from the designed value. The "decolorization" effect is particularly important for the optical disc device of the optical recording modulation type. While the optical disc device of this type is adapted to record signals on a disc-shaped medium by changing the output power of the laser, the laser wavelength can fluctuate at the very start and the very end of its operation. If the anamorphic prism is not provided with the "decolorization" effect, the angle of the light beam coming out from the anamorphic prism can change significantly so that the beam spot formed on the disc by the objective lens can be remarkably shifted from the proper position. Then, the jitter can be increased when the anamorphic prism is used in the direction of scanning density of the optical disc, whereas the problem of a detracked light spot arises for signal recording/reproduction when the anamorphic prism is used in the radial direction of the optical disc.

Conventionally, a technique of combining a vitreous material of the crown glass type having a large Abbe's number whose refractive index can hardly be affected to change as a function of the wavelength of light and a vitreous material of the flint glass type having a small Abbe's number whose refractive index can be greatly affected to change as a function of the wavelength of light is used for realizing the "decolorization" effect for an anamorphic prism as for a lense. For example, an anamorphic prism 101 as shown in FIG. 1 is designed to show a magnification of conversion of 1.9 to incident light with a wavelength of 660 nm. However, such an anamorphic prism can greatly restrict the freedom of designing the configuration of the optical components of the optical head because the direction of the light beam striking the prism and that of the light beam leaving the prism are remarkably differentiated by an angle of 24.63.

FIG. 2 schematically illustrates the arrangement of a known optical head comprising such an anamorphic prism and that of the drive section of a known optical disc device realized by using such an optical head. FIG. 3 is a schematic lateral view of a principal portion of the optical disc device of FIG. 2 as viewed in the direction of arrow D in FIG. 2.

Normally, for forming an optical head, the direction of arrangement of an anamorphic prism is determined according to the divergence angle of the semiconductor laser.

The optical path of the optical head of FIG. 2 will be briefly described here. The laser beam emitted from the semiconductor laser 105 is collimated by collimator lens 106 for the forward direction and then strikes the anamorphic prism 101. The laser beam entering the anamorphic prism 101 is expanded by 1.9 times in terms of a cross section of the laser beam in the direction corresponding to that of $\theta//$ to correct the unevenness of the intensity distribution of the laser beam. The laser beam whose intensity distribution is corrected by the anamorphic prism 101 is then emitted from the latter to enter grating 107. The laser beam is then divided by the grating 107 into a principal beam to be used for the purpose of tracking error detection and a plurality of auxiliary beams before being transmitted through the polarization beam splitter plane of polarization beam splitter prism 108. The polarization beam splitter plane transmits p-polarized light and reflects s-polarized light. The leaser beam transmitted through the polarization beam splitter plane is then made to enter ¼ wave plate 109 to become circularly polarized light and then its direction is bent by 90° by a bending mirror 110, which is arranged to make the optical head 104 thin, before the laser beam strikes the objective lens 111. The laser beam that enters the objective lens 111 is then focussed onto the signal recording surface of the optical disc 116 to recording signals on or reproduce signals from the optical disc. The laser beam reflected by and returning from the optical disc 116 is collimated by the objective lens 111 and then its direction is bent by 90° by the bending mirror 110 so that the laser beam strikes the ¼ wave plate 109, which shifts the direction of polarization of the laser beam by 90° relative to that of the forwardly proceeding laser beam. Thus, the returning laser beam whose direction of polarization is shifted by 90° relative to that of the forwardly proceeding laser beam is reflected by the polarization beam splitter plane of the polarization beam splitter prism 108 as S-polarized light and totally reflected by the total reflection plane before entering collimator lens 112 for the backward direction. The returning laser beam that enters the collimator lens 112 for the backward direction is converted into a convergent light beam and then provided with astigmatism by multi-lens 113 for the purpose of focus error signal detection before it is received by a photodetector. The operation of reproducing information and the light spot on the optical disc are controlled on the basis of the optical signal of the returning light beam received by the photodetector.

The known optical device realized by using the known optical head 104 that has the above described configuration can be down-sized because the radial dimension of the optical disc 116 can be reduced and hence the drive can be down-sized.

If $\theta_\parallel = 10°$, $\theta_\perp = 25°$, an magnification of conversion $\beta$ of 1.9 times and an effective NA of the collimator of 0.17 for the forward direction are selected for the distribution of intensity of light on the plane of the pupil of the objective lens and the intensity of light at the center of the pupil of the objective lens is 1, the intensity of light is 0.66 at the outer edge in the direction of scanning density of the tracks and 0.48 at the outer edge in the radial direction of the optical disc. Thus, the intensity of light is less reduced in the direction of scanning density of the tracks.

However, in some optical disc devices, the reduction in the intensity of light is made less in the radial direction of the optical disc than in the direction of scanning density of the tracks. For such an optical disc device to comprise the components of FIG. 2, it has to take one of the three different arrangements as described below. However, the three different arrangements are accompanied by the respective problems as pointed out below.

FIG. 4 shows an arrangement of optical disc device where the semiconductor laser 105 and the anamorphic prism 101 are rotated by 90° relative to each other by taking the relationship of the two intensities of light. FIG. 5 is a schematic lateral view of a principal portion of the arrangement of FIG. 4 as viewed in the direction of arrow E. With this arrangement, since light entering the polarization beam splitter prism 108 is S-polarized, a half wave plate 115 is inserted to change to produce P-polarized light. However, with this arrangement, since the anamorphic prism 101 inclines the optical axis to 24.63°, the optical head 104 has a large height to by turn make the optical device large and, additionally, it is difficult to maintain the desired accuracy level for machining the base on which the components are arranged.

FIG. 6 shows another arrangement of optical disc where the anamorphic prism 101 is replaced by an anamorphic prism 117 that is of the type realized without bonding two prisms due to avoid the inclination of the optical axis on the optical path. FIG. 7 is a schematic lateral view of a principal portion of the arrangement of FIG. 6 as viewed in the direction of arrow F. FIG. 8 is an enlarged view of the anamorphic prism 117. With this arrangement of using the anamorphic prism 117, while both light entering the anamorphic prism 117 and light exiting the anamorphic prism 117 can be made parallel to each other, the component members of the prism including a first prism 118, a second prism 119 and a holder member 120 have to be bonded individually and accurately so that the operation of preparing such an anamorphic prism 117 is a time consuming one and hence the efficiency of manufacturing such anamorphic prisms 117 is inevitably low.

FIG. 9 shows an arrangement of optical disc device where relative angle of the semiconductor laser 105 and the anamorphic prism 101 is held unchanged but all the remaining components are turned by 90°. FIG. 10 is a schematic lateral view of a principal portion of the arrangement of FIG. 9 as viewed in the direction of arrow G. With this arrangement, due to the change in the positional relationship of the optical disc 116 relative to the tracks, both the grating 107 and the photodetector 114 are turned by 90°. While this arrangement does not entail the problem of the height of the optical head 104 and the machining accuracy of the base nor the problem of a low efficiency of manufacturing anamorphic prisms 101, the optical disc is made to show a large radial dimension to make the drive very large so that it is difficult to down-size the optical disc device.

BRIEF SUMMARY OF THE INVENTION

In view of the above identified circumstances of the prior art, it is therefore the object of the present invention to provide an anamorphic prism that can easily modify the intensity distribution of the light beam on the recording medium and allow the device comprising it to operate for signal recording/reproduction in optimal conditions without significantly increasing the dimensions of the device as well as an optical head and an optical recording/reproduction device comprising such an anamorphic prism that are small and can be manufactured with a high manufacturing efficiency.

According to the invention, the above object is achieved by providing an anamorphic prism typically adapted to compress or expand the incident light beam in a particular direction of cross section of the light beam before letting it exit therefrom, said anamorphic prism comprising:

a first prism made of a first light transmitting material; and a second prism made of a second light transmitting material;

said first prism and said second prism being bonded together along predetermined respective planes thereof;

the light beam entering said first prism being expanded or compressed in a particular direction of cross section of the beam with a predetermined magnification;

the expanded or compressed light beam being let to exit from said second prism and proceed in a direction substantially same as the proceeding direction of the incident light beam entering said first prism.

Since an anamorphic prism according to the invention comprises a first prism made of a first light transmitting material and a second prism made of a second light transmitting material that are bonded together along predetermined respective planes thereof, it can be prepared with ease and such anamorphic prisms can be manufactured with a high manufacturing efficiency.

Additionally, since an anamorphic prism according to the invention is so designed that the light beam entering the first prism is expanded or compressed in a particular direction of cross section of the beam with a predetermined magnification and the expanded or compressed light beam is let to exit from the second prism and proceed in a direction substantially same as the proceeding direction of the incident light beam entering the first prism, the anamorphic prism has both the characteristic property of an anamorphic prism realized without bonding prisms that allows both light entering the anamorphic prism 117 and light exiting the anamorphic prism 117 to be made parallel to each other and that of an anamorphic prism realized by bonding prisms that allows the prism to be prepared with a high manufacturing efficiency.

In another aspect of the invention, there is also provided an optical head adapted to direct the light beam from a light source to an optical recording medium, said optical head comprising:

an anamorphic prism for converting the light beam emitted from the light source in a particular direction of cross section of the light beam;

an objective lens for converging the light beam emitted from said anamorphic prism and irradiating an optical recording medium with the light beam; and an photodetector for receiving the light beam reflected by and returning from said optical recording medium;

said anamorphic prism having:

a first prism made of a first light transmitting material; and a second prism made of a second light transmitting material;

said first prism and said second prism being bonded together along predetermined respective planes thereof;

the light beam entering said first prism being expanded or compressed in a particular direction of cross section of the beam with a predetermined magnification;

the expanded or compressed light beam being let to exit from said second prism and proceed in a direction substantially same as the proceeding direction of the incident light beam entering said first prism.

Since an optical head according to the invention comprises an anamorphic prism having a first prism made of a first light transmitting material and a second prism made of a second light transmitting material that are bonded together along predetermined respective planes thereof, it can be prepared with ease and such anamorphic prisms can be manufactured with a high manufacturing efficiency.

Additionally, since optical head according to the invention comprises an anamorphic prism so designed that the light beam entering the first prism is expanded or compressed in a particular direction of cross section of the beam with a predetermined magnification and the expanded or compressed light beam is let to exit from the second prism and proceed in a direction substantially same as the proceeding direction of the incident light beam entering the first prism, the optical head can be down-sized.

In still another aspect of the invention, there is provided an optical recording/reproduction device for optically recording an information signal on and reproducing an information signal from the signal recording surface of an optical recording medium, said device comprising:

an optical head including:

a light source;

an anamorphic prism for converting the light beam emitted from the light source in a particular direction of cross section of the light beam;

an objective lens for converging the light beam emitted from said anamorphic prism and irradiating an optical recording medium with the light beam; and an photodetector for receiving the light beam reflected by and returning from said optical recording medium;

a signal processing circuit for processing the detection signal from said optical head; and a control means for controlling the operation of said optical head according to the output of said signal processing circuit;

said anamorphic prism having:

a first prism made of a first light transmitting material; and a second prism made of a second light transmitting material;

said first prism and said second prism being bonded together along predetermined respective planes thereof;

the light beam entering said first prism being expanded or compressed in a particular direction of cross section of the beam with a predetermined magnification;

the expanded or compressed light beam being let to exit from said second prism and proceed in a direction substantially same as the proceeding direction of the incident light beam entering said first prism.

Since an optical recording/reproduction device according to the invention comprises an anamorphic prism having a first prism made of a first light transmitting material and a second prism made of a second light transmitting material that are bonded together along predetermined respective planes thereof, it can be prepared with ease and such anamorphic prisms can be manufactured with a high manufacturing efficiency.

Additionally, since optical recording/reproduction device according to the invention comprises an anamorphic prism so designed that the light beam entering the first prism is expanded or compressed in a particular direction of cross section of the beam with a predetermined magnification and the expanded or compressed light beam is let to exit from the second prism and proceed in a direction substantially same as the proceeding direction of the incident light beam entering the first prism, the optical recording/reproduction device can be down-sized.

As pointed out above, an anamorphic prism according to the invention comprises a first prism made of a first light transmitting material and a second prism made of a second light transmitting material that are bonded together along predetermined respective planes thereof. Additionally, the anamorphic prism is so designed that the light beam entering the first prism is expanded or compressed in a particular direction of cross section of the beam with a predetermined magnification and the expanded or compressed light beam is let to exit from the second prism and proceed in a direction substantially same as the proceeding direction of the incident light beam entering the first prism. Therefore, the anamorphic prism has both the characteristic property of an anamorphic prism realized without bonding prisms that allows both light entering the anamorphic prism and light exiting the anamorphic prism to be made parallel to each other and that of an anamorphic prism realized by bonding prisms that allows the prism to be prepared with a high manufacturing efficiency.

An optical head according to the invention comprises an anamorphic prism for converting the light beam emitted from a light source in a particular direction of cross section of the light beam, an objective lens for converging the light beam emitted from said anamorphic prism and irradiating an optical recording medium with the light beam and an photodetector for receiving the light beam reflected by and returning from said optical recording medium, said anamorphic prism having a first prism made of a first light transmitting material and a second prism made of a second light transmitting material, said first prism and said second prism being bonded together along predetermined respective planes thereof, the light beam entering said first prism being expanded or compressed in a particular direction of cross section of the beam with a predetermined magnification, the expanded or compressed light beam being let to exit from said second prism and proceed in a direction substantially same as the proceeding direction of the incident light beam entering said first prism. Since an optical head according to the invention comprises an anamorphic prism having such a configuration, it can be prepared with ease and manufactured with a high manufacturing efficiency. Additionally, such an optical head can be significantly down-sized.

An optical recording/reproduction device for optically recording an information signal on and reproducing an information signal from the signal recording surface of an optical recording medium according to the invention comprises an optical head including a light source, an anamorphic prism for converting the light beam emitted from the light source in a particular direction of cross section of the light beam, an objective lens for converging the light beam emitted from said anamorphic prism and irradiating an optical recording medium with the light beam and an photodetector for receiving the light beam reflected by and returning from said optical recording medium, a signal processing circuit for processing the detection signal from said optical head and a control means for controlling the operation of said optical head according to the output of said signal processing circuit, said anamorphic prism having a first prism made of a first light transmitting material and a second prism made of a second light transmitting material, said first prism and said second prism being bonded together along predetermined respective planes thereof, the light beam entering said first prism being expanded or compressed in a particular direction of cross section of the beam with a predetermined magnification, the expanded or compressed light beam being let to exit from said second prism and proceed in a direction substantially same as the proceeding direction of the incident light beam entering said first prism. Since an optical recording/reproduction device according to the invention comprises an anamorphic prism having such a configuration, it can be prepared with ease and manufactured with a high manufacturing efficiency. Additionally, such an optical head can be significantly down-sized.

Therefore, according to the invention, there is provided an anamorphic prism that can easily modify the intensity distribution of the light beam on the recording medium and allow the device comprising it to operate for signal recording/reproduction in optimal conditions without significantly increasing the dimensions of the device along with an optical head and an optical recording/reproduction device comprising such an anamorphic prism that are small and can be manufactured with a high manufacturing efficiency.

DETAILED DESCRIPTION OF THE INVENTION

Figure 1:
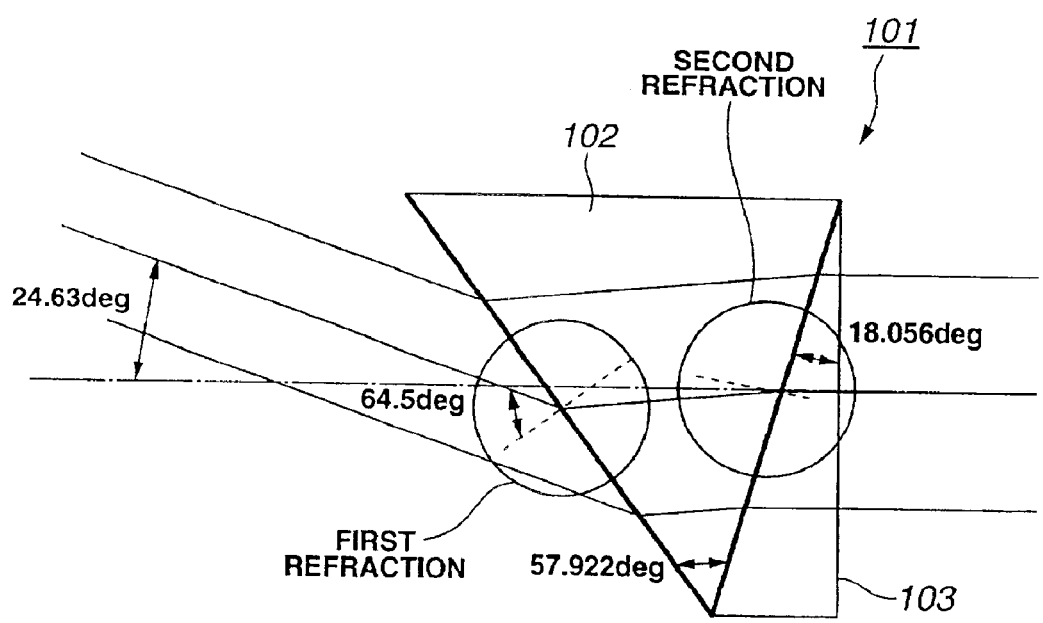
FIG. 1 is a schematic cross sectional view of a conventional anamorphic prism.
Figure 2:
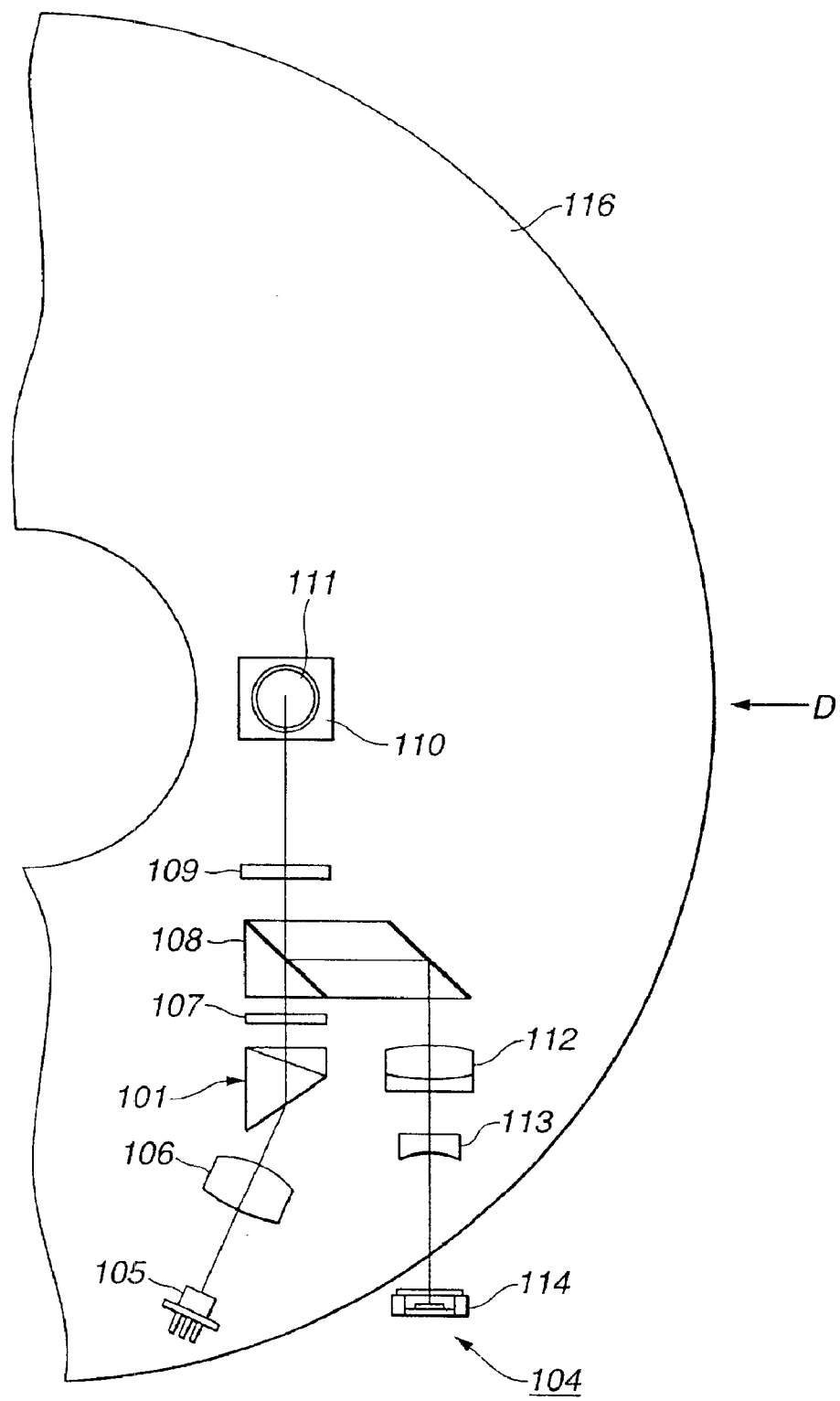
FIG. 2 is a schematic plan view of an optical head comprising a conventional anamorphic prism and the drive of an optical disc device realized by using the optical head, illustrating a principal portion thereof.
Figure 3:
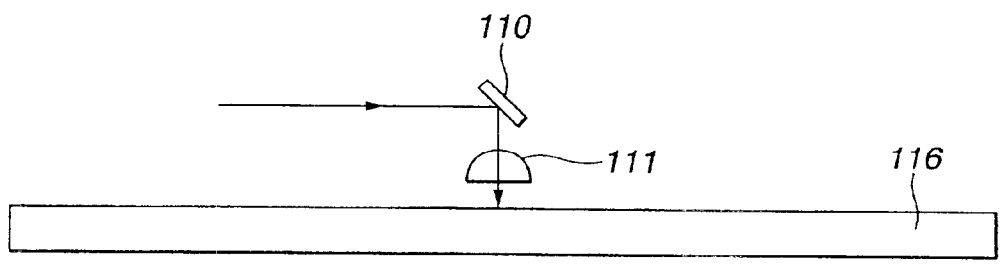
FIG. 3 is a schematic lateral view of the optical disc device of FIG. 2 as viewed along arrow D in FIG. 2, illustrating a principal portion thereof.
Figure 4:
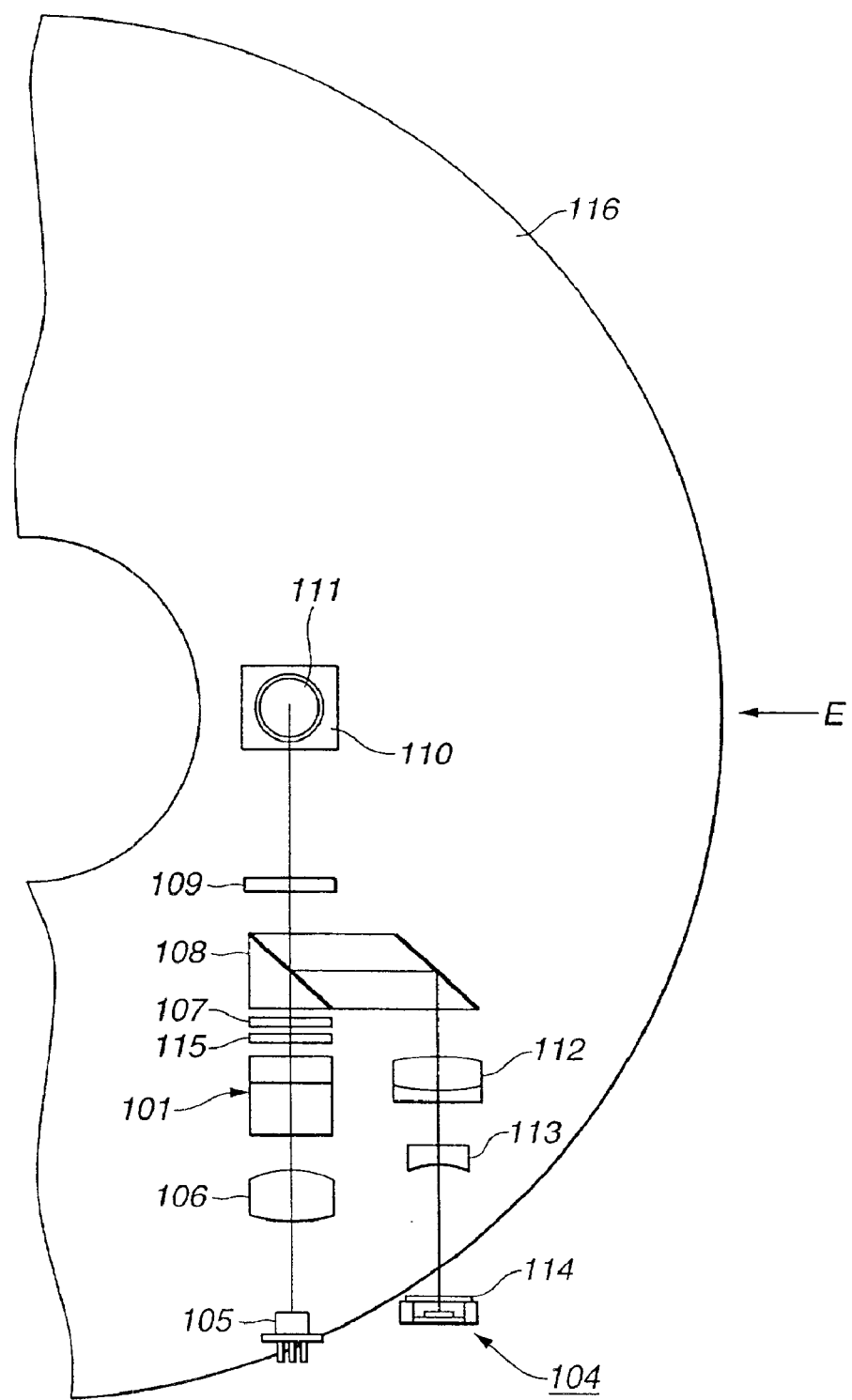
FIG. 4 is a schematic plan view of an optical head comprising another conventional anamorphic prism and the drive of an optical disc device realized by using the optical head, illustrating a principal portion thereof.
Figure 5:
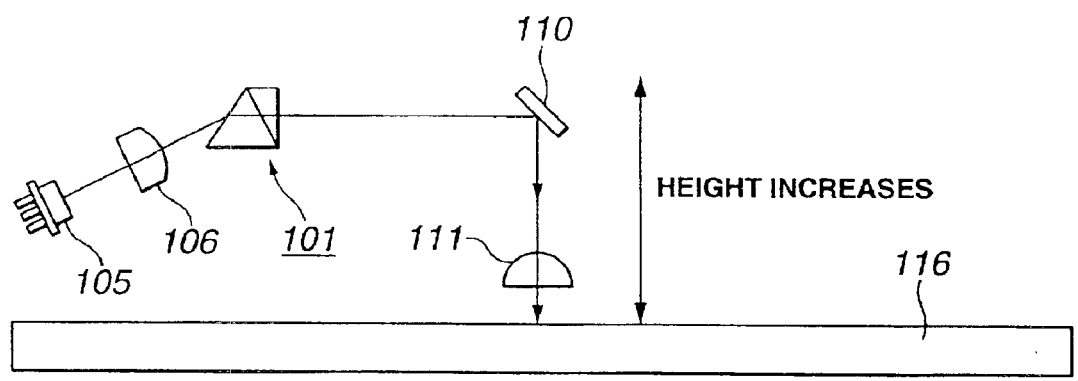
FIG. 5 is a schematic lateral view of the optical disc device of FIG. 4 as viewed along arrow E in FIG. 4, illustrating a principal portion thereof.
Figure 6:
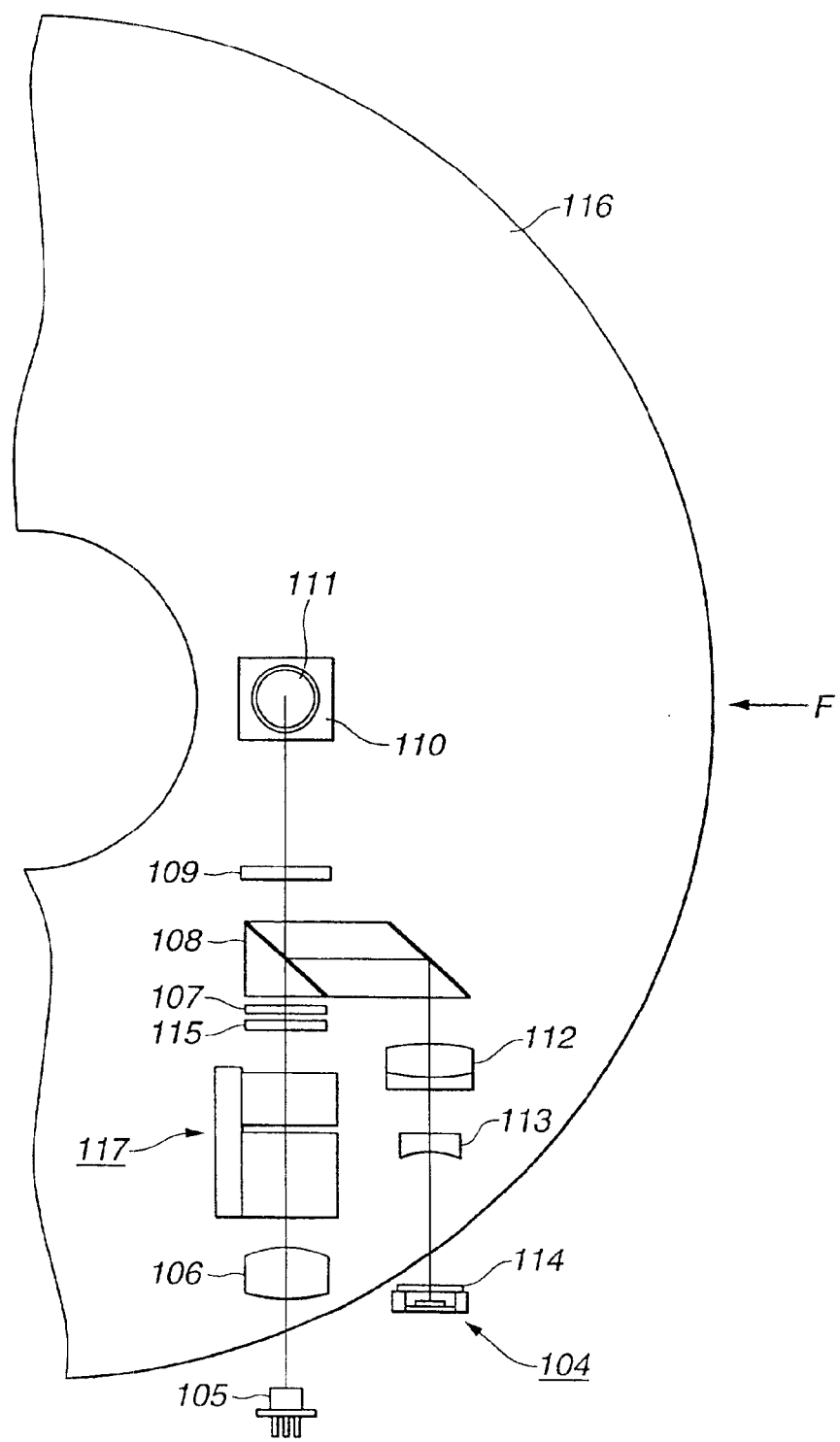
FIG. 6 is a schematic plan view of an optical head comprising still another conventional anamorphic prism and the drive of an optical disc device realized by using the optical head, illustrating a principal portion thereof.
Figure 7:
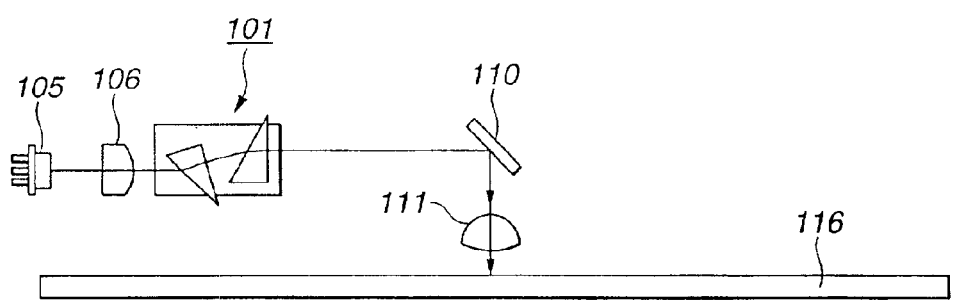
FIG. 7 is a schematic lateral view of the optical disc device of FIG. 6 as viewed along arrow F in FIG. 6, illustrating a principal portion thereof.
Figure 8:
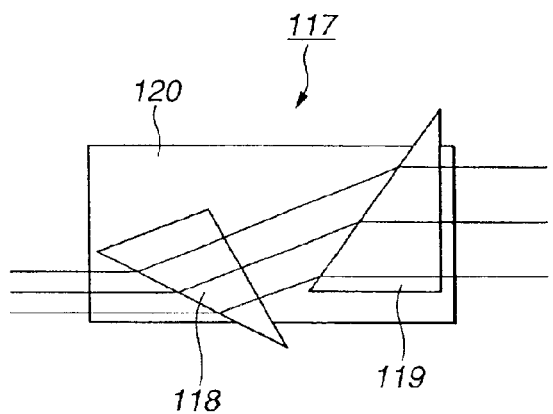
FIG. 8 is an enlarged schematic cross sectional view of an anamorphic prism realized without bonding two anamorphic prisms.
Figure 9:
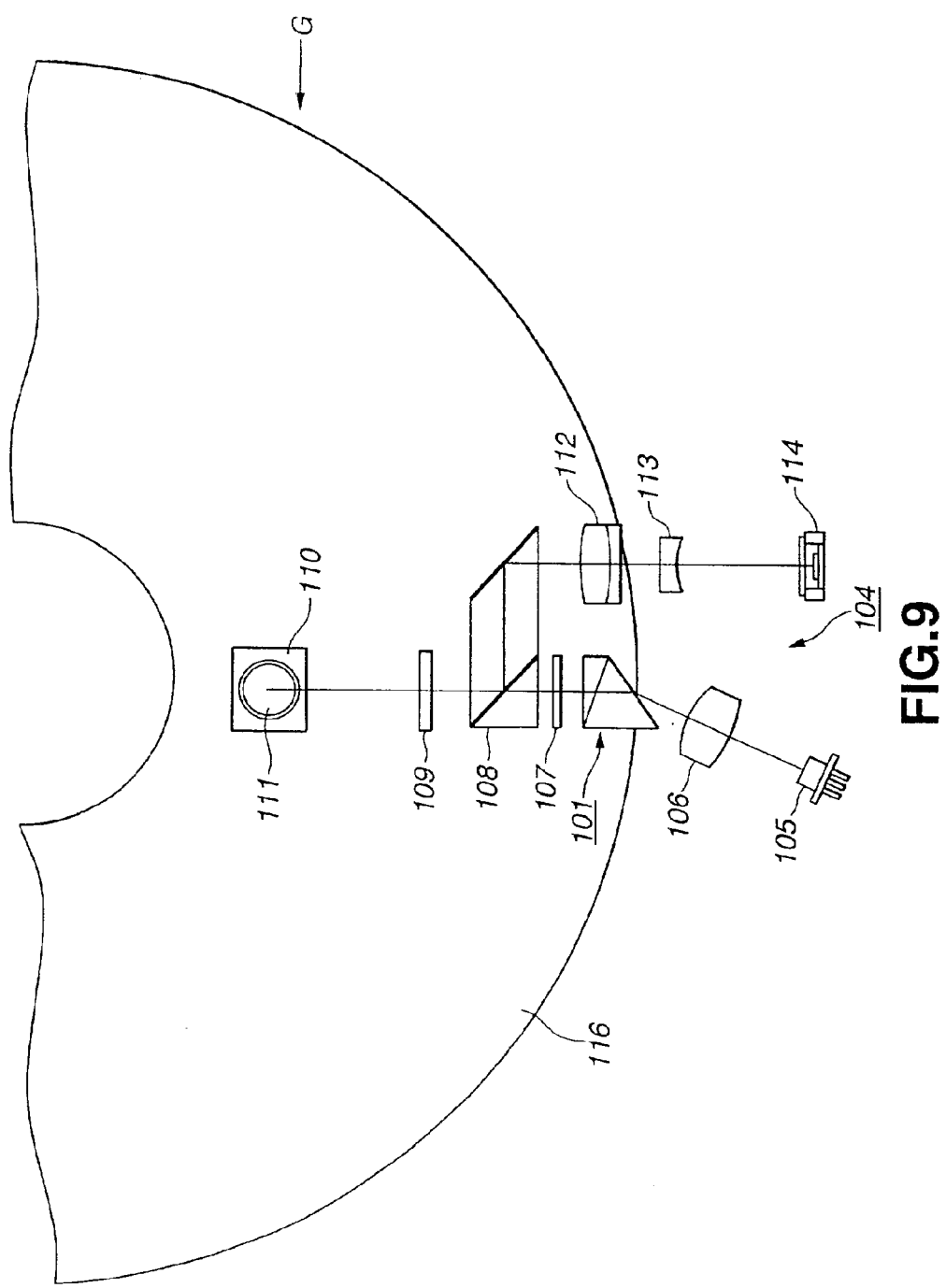
FIG. 9 is a schematic plan view of an optical head comprising still another conventional anamorphic prism and the drive of an optical disc device realized by using the optical head, illustrating a principal portion thereof.
Figure 10:
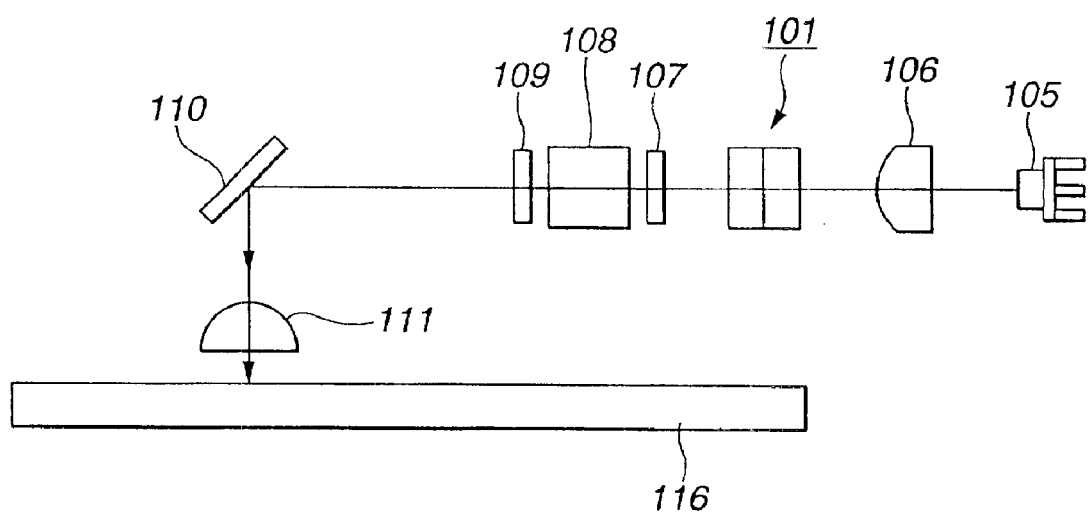
FIG. 10 is a schematic lateral view of the optical disc device of FIG. 9 as viewed along arrow F in FIG. 9, illustrating a principal portion thereof.

Now, the present invention will be described in greater detail by referring to the accompanying drawing that illustrate preferred embodiments of the invention. While the embodiments as described hereinafter are specifically and technologically defined in various ways, the present invention is by no means limited thereto and they can be modified appropriately without departing from the scope of the invention.

Firstly an embodiment of anamorphic prism according to the invention will be described by referring to FIG. 11. The anamorphic prism 1 is a decolorizing anamorphic prism having a decolorization and comprises a pair of prisms made of different vitreous materials. More specifically, it comprises a first prism 2 made of BAM3 (tradename, available from OHARA) and a second prism 3 made of SLAM60 (tradename, available from OHARA) that are bonded together. The anamorphic prism 1 is adapted to handle light with a wavelength of 660±30 nm.

While the anamorphic prism 1 is formed by bonding two different vitreous materials together, the light beam entering the anamorphic prism 1 and the corresponding light beam coming out of the anamorphic prism 1 are made to proceed substantially in parallel with each other. More specifically, the anamorphic prism 1 is adapted to convert the incoming light beam with a predetermined magnification in a predetermined direction in a cross section of the light beam and let the outgoing light beam leave the prism in a direction substantially parallel to that of the incoming light beam. With this arrangement, the distribution of intensity of light on the pupil of the objective lens can be modified with ease by modifying the relative direction the semiconductor laser 8 and the anamorphic prism 1.

Additionally with this anamorphic prism 1, since the optical axis of the incoming light beam and that of the outgoing light beam are not inclined relative to each other, the optical head comprising it is not dimensionally affected by the use of the prism. In other words, since the incoming light beam and the outgoing light beam of the anamorphic prism 1 proceed in parallel with each other, it is not necessary for the optical head comprising it to be provided with space for accommodating the relative inclination of the optical axis of the incoming light beam and that of the outgoing light beam. Thus, it is possible to down-size the optical head.

Additionally, the anamorphic prism 1 does not require any special manufacturing steps. In other words, it can be prepared by using an appropriate conventional anamorphic prism manufacturing process. Still additionally, since the optical axis of the incoming light beam and that of the outgoing light beam are not inclined relative to each other, the anamorphic prism 1 is not subjected to rigorous requirements in terms of accuracy of machining and fixation if compared with conventional anamorphic prisms so that it can be manufactured with an enhanced level of efficiency.

Conventional anamorphic prisms are prepared by combining a crown type vitreous material that has a large Abbe's number and hence whose refractive index is less affected by wavelength and a flint type vitreous material that has a small Abbe's number and hence whose refractive index is more affected by wavelength. On the other hand, the anamorphic prism 1 according to the invention is realized by combining two vitreous materials whose Abbe's numbers are substantially equal but whose refractive indexes are different from each other.

An decolorizing anamorphic prism produces two effects of "conversion of a cross section of a light beam" and "decolorization" by way of double refractions. Table 1 summarily shows in comparison the characteristics of a conventional anamorphic prism and those of the above embodiment of anamorphic prism.

TABLE 1

| | conventional anamorphic prism | anamorphic prims of present invention |
|---|---|---|
| refractive index | second vitreous material is greater than first vitreous material | second vitreous material is greater than first vitreous material |
| change of refractive index due to wavelength | second vitreous material is significantly greater than first vitreous material | second vitreous material is equal to or slightly greater than first vitreous material |
| anamorphic magnification | secured by first refraction | secured by second refraction |

Table 2 below shows numerical values obtained for the two different anamorphic prisms of Table 1.

TABLE 2

| | | conventional anamorphic prism | anamorphic prism of present invention |
|---|---|---|---|
| refractive index of light with wavelength of 660 nm | first vitreous material (N1) | 1.51374 | 1.578761 |
| | second vitreous material (N2) | 1.775572 | 1.738444 |
| change in refractive index with wavelength between 630 nm and 690 nm | first vitreous material (ΔN1) | 0.001848 | 0.00274 |
| | second vitreous material (ΔN2) | 0.006293 | 0.003353 |
| anamorphic magnification | total manification | 1.90 times | 1.90 times |
| | magnification at first refraction | 1.87 times | 1.12 times |
| | magnification at second refraction | 1.02 times | 1.70 times |

Figure 11:
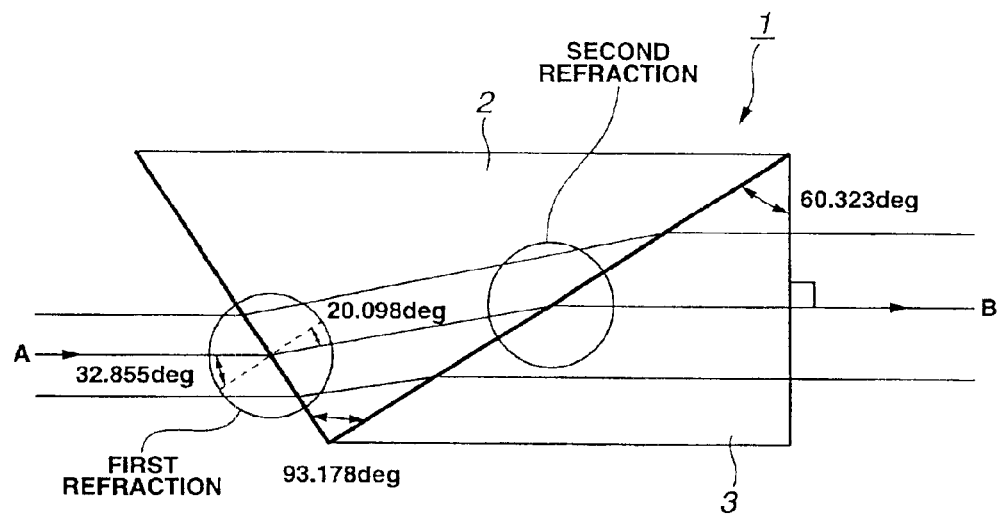
FIG. 11 is a schematic cross sectional view of an embodiment of anamorphic prism according to the invention.

The term "anamorphic magnification" refers to the coefficient of expansion for a light beam proceeding along the direction of A→B in FIG. 11. However, if the light beam is made to proceed in an anamorphic prism along the direction of B→A in FIG. 11 to reduce the cross section of the light beam, the anamorphic magnification will be the reciprocal of the coefficient of compression.

As seen from Table 2, with the anamorphic prism 1 according to the invention, the magnification of conversion due to the second refraction at the junction plane of the first prism 2 and the second prism 3 is greater than the corresponding one due to the first refraction at the entrance plane of the first prism. The term "magnification of conversion" refers to the coefficient of expansion or compression of a cross section of the light beam. Thus, the expression of "a large magnification of conversion" means that, if the cross section of the light beam before the conversion is equal to 1, the coefficient of expansion or compression of the cross section of the light beam differs significantly from 1. If the anamorphic prism 1 is used to reduce the cross section of the light beam in a particular direction, "the magnification of conversion is large" when the coefficient of compression is much smaller than 1.

With a conventional anamorphic prism, the wavelength dependency of refractive index differs greatly between the vitreous material of the first prism and that of the second prism so that only a small value can be selected for the angle of refraction required to compensate the wavelength dependency of angle of refraction produced by the first refraction at the entrance plane of the first prism. As a result, the angle of incidence of the light beam produced by the second refraction at the junction plane of the first prism and the second prism becomes small. Thus, the angular change of the proceeding direction of the light beam due to the first refraction is directly reflected to the change in the proceeding direction between the incoming light beam and the outgoing light beam.

To the contrary, with the above described embodiment of anamorphic prism 1, the wavelength dependency of refractive index differs only slightly between the vitreous material of the first prism and that of the second prism so that a large value can be selected for the angle of refraction required to compensate the wavelength dependency of angle of refraction produced by the first refraction at the entrance plane of the first prism. As a result, the angle of incidence of the light beam produced by the second refraction at the junction plane of the first prism 2 and the second prism 3 becomes large. Thus, the anamorphic prism 1 can be designed in such a way that the angular change of the proceeding direction of the light beam due to the first refraction is made substantially equal to the angular change of the proceeding direction of the light beam due to the second refraction and the wavelength dependency of angle of refraction produced by the angular change due to the first refraction is also made substantially equal to the wavelength dependency of angle of refraction produced by the angular change due to the second refraction. Additionally, since the second refraction can be utilized to remarkably increase the anamorphic magnification, the angular change due to the first refraction and hence the wavelength dependency of angle of refraction to be corrected by the second refraction can be suppressed to a low level.

The anamorphic prism 1 is so designed that ratio of the change $\Delta N1$ in the refractive index of the first vitreous material caused by wavelength as divided by the refractive index $N1$ of the first vitreous material to the change $\Delta N2$ in the refractive index of the second vitreous material caused by wavelength as divided by the refractive index $N2$ of the second vitreous material is substantially equal to the ratio of the refractive index $N1$ to the refractive index $N2$. In other words, in the anamorphic prism 1, the expression (1) below holds true.

$$(\Delta N2/N2)/(\Delta N1/N1) \approx (N2/N1) \quad (1)$$

Additionally, when the anamorphic prism 1 is used for an optical disc device, it will be used with a narrow wavelength range so that changes in the refractive indexes caused by wavelength $\Delta N1$ and $\Delta N2$ are used without modification. When the anamorphic prism 1 is required to accommodate a wider wavelength range, the refractive indexes Nd1 and Nd2 and the Abbe's numbers vd1 and vd2 for the d line may be used directly to obtain formula (2) below.

$$(vd1/vd2) \approx (Nd2/Nd1) \quad (2)$$

Table 3 shows the results obtained by applying the values of the conventional anamorphic prism and the anamorphic prism according to the invention listed in Table 2 to the above formula (1).

TABLE 3

| | left side $(\Delta N2/N2)/(\Delta N1/N1)$ | right side $(N2/N1)$ |
|---|---|---|
| conventional anamorphic prism | 2.903145 | 1.17297 |
| anamorphic prism of present invention | 1.111319 | 1.101145 |

From Table 3, it will be seen that the left side and the right side of the formula (1) differ greatly in the case of the conventional anamorphic prism, whereas the value of the left side is substantially equal to that of the right side in the case of the anamorphic prism 1 according to the invention. Therefore, it will be appreciated that a decolorizing anamorphic prism that can make the incoming light beam and the outgoing light beam proceed substantially in parallel with each other can be prepared when the requirement of the formula (1) is met.

Formula (3) below can be obtained by modifying the formula (1) above.

$$(\Delta N2/\Delta N1) \times (N1^2/N2^2) \approx 1 \quad (3)$$

Thus, the anamorphic magnification can be modified, while satisfying "the requirement of parallelism of the incoming light beam and the outgoing light beam" and the "requirement of decolorization", by slightly changing the value of the left side from 1.

Figure 12:
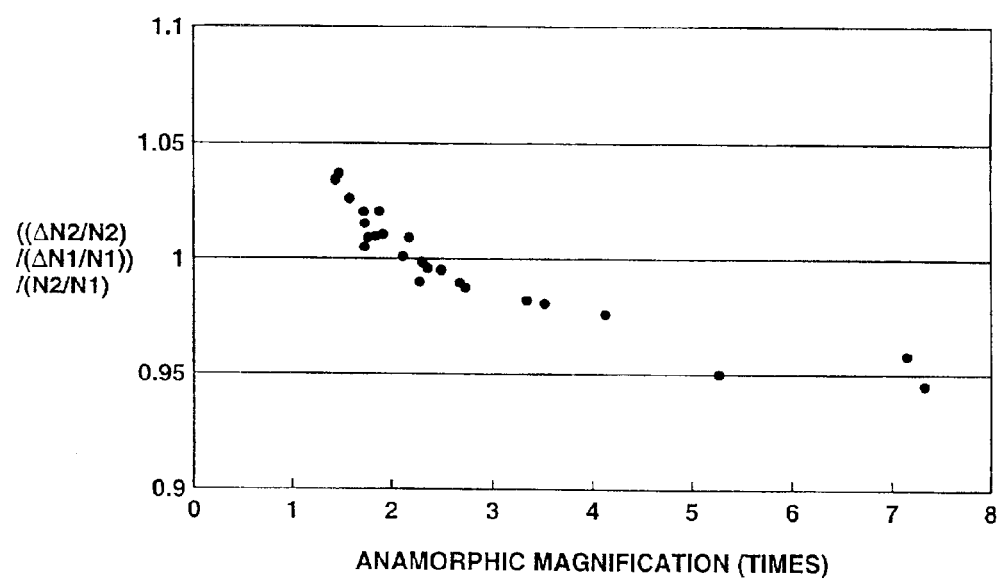
FIG. 12 is a graph illustrating the relationship between the anamorphic magnification and the value of the left side of formula (3)

Currently, efforts are being paid to develop optical discs for practical applications that are adapted to be used with a laser beam having a wavelength shorter than ever of about 405 nm in order to achieve a higher recording density. FIG. 12 is a graph of the values obtained for the left side of the formula (3) above by changing the combination of the vitreous materials of the first and second prisms for a laser beam with a center frequency of 405 nm and a wavelength range of ±10 nm (from 395 nm to 415 nm) selected as design values.

From FIG. 12, it will be seen that the correlation of the value of the left side of the formula (3) and the anamorphic magnification is very strong, although it may vary significantly depending on the selected vitreous materials. This correlation remains substantially same with slight fluctuations as a function of the vitreous materials of the first and second prisms, the wavelength of the laser beam used and the range of the change in the wavelength that may be involved. This is also proved by the fact that the anamorphic magnification that is made to vary as a function of the selected vitreous materials of the first and second prisms for a laser beam with a center frequency of 660 nm and a wavelength range of ±30 nm (from 630 nm to 690 nm) selected as design values is found within the distribution zone of FIG. 12.

From these results, it will be appreciated that an anamorphic prism showing a desired anamorphic magnification and providing the effects of satisfying "the requirement of parallelism of the incoming light beam and the outgoing light beam" and the "requirement of decolorization" can be obtained by selecting vitreous materials for the first and second prisms that satisfy the requirement of formula (4) below.

$$0.7 \leq (\Delta N2/\Delta N1) \times (N1/N2)^2 \leq 1.4 \quad (4)$$

Figure 13:
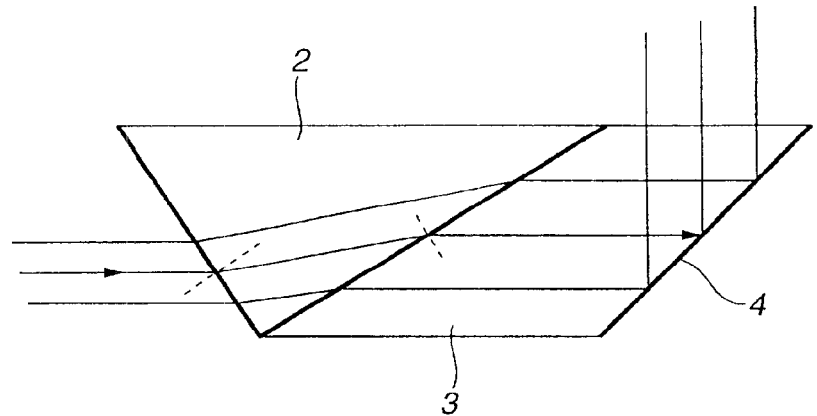
FIG. 13 is a schematic cross sectional view of an embodiment of anamorphic prism according to the invention and having a reflection plane on a surface thereof.
Figure 14:
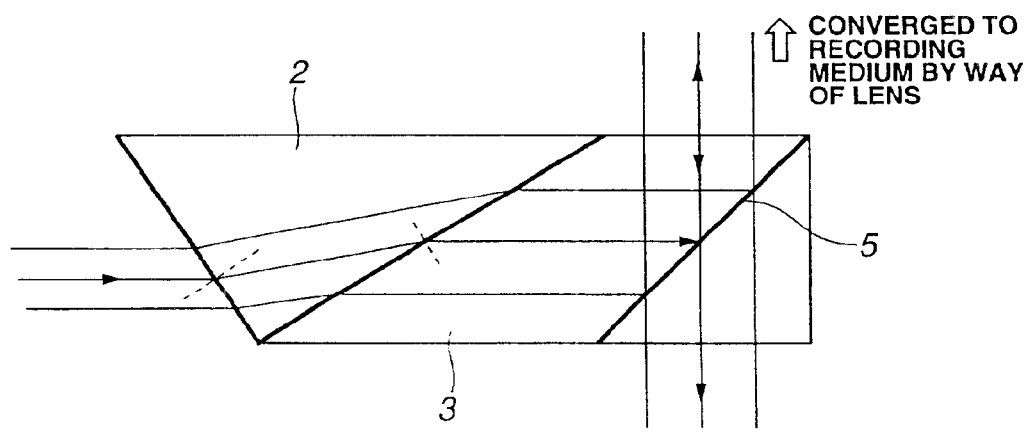
FIG. 14 is a schematic cross sectional view of another embodiment of anamorphic prism according to the invention and having a beam splitter plane on a surface thereof.

Depending on the configuration of the optical system, an anamorphic prism according to the invention may be made to show a reflection plane as shown in FIG. 13 or FIG. 14.

The anamorphic prism 1 illustrated in FIG. 13 has a reflection plane at the side opposite to the plane where the second prism 3 is bonded to the first prism 2. The proceeding direction of the light beam that enters the anamorphic prism 1 is changed by the first refraction at the entrance plane of the first prism 2 and then changed again to make the light beam proceed substantially in parallel with the light beam entering the first prism by the second refraction at the junction plane of the first prism and the second prism. Then, the light beam is reflected by the reflection plane arranged at the oppositely located plane of the second prism 3 to change its direction by 90° from the direction of the light beam entering the first prism before it goes out of the anamorphic prism 1. The outgoing light beam is converted by a predetermined magnification in a predetermined direction of cross section of the light beam.

The anamorphic prism 1 illustrated in FIG. 14 is typically provided with a polarization beam splitter 5 arranged at the side opposite to the plane where the second prism 3 is bonded to the first prism 2. The proceeding direction of the light beam that enters the anamorphic prism 1 is changed by the first refraction at the entrance plane of the first prism 2 and then changed again to make the light beam proceed substantially in parallel with the light beam entering the first prism 2 by the second refraction at the junction plane of the first prism 2 and the second prism 3. Then, the light beam is reflected by the beam splitter plane 5 arranged at the oppositely located plane of the second prism 3 to change its direction in a predetermined manner before it goes out of the anamorphic prism 1. The outgoing light beam is converted by a predetermined magnification in a predetermined direction of cross section of the light beam. The light beam that goes out in the predetermined direction is then made to irradiate an optical disc by way of a lens and the reflected light beam reenters the second prism 3 to reversely follow the light path and then become transmitted through the beam splitter plane 5 to go out from the second prism 3 in a direction bent by 90° from the direction of the light beam entering the first prism 2.

Thus, both of the anamorphic prism 1 illustrated in FIG. 13 and the one illustrated in FIG. 14 are adapted to convert the outgoing beam with a predetermined magnification in a particular direction of cross section of the incoming light beam and bend the direction of the outgoing light beam by 90° from the direction of the incoming light beam.

Thus, an anamorphic prism 1 according to the invention is realized by bonding two prisms made of respective vitreous materials that are different from each other and adapted to convert the incoming light beam to expand or compress it in a particular direction with a predetermined magnification in order to produce an outgoing light beam that proceeds substantially in parallel with the incoming light beam. Since the two vitreous materials have a substantially same Abbe's number and different refractive indexes, the angular change due to the first refraction is made substantially equal to the angular change of the proceeding direction of the light beam due to the second refraction and, the wavelength dependency of angle of refraction produced by the angular change due to the first refraction is also made substantially equal to the wavelength dependency of angle of refraction produced by the angular change due to the second refraction. Therefore, although the anamorphic prism is of the bonded type, it can make the outgoing light beam substantially parallel to the incoming light beam.

Additionally, the bonded type anamorphic prism 1 according to the invention can be prepared with ease to realize a high manufacturing efficiency.

Figure 15:
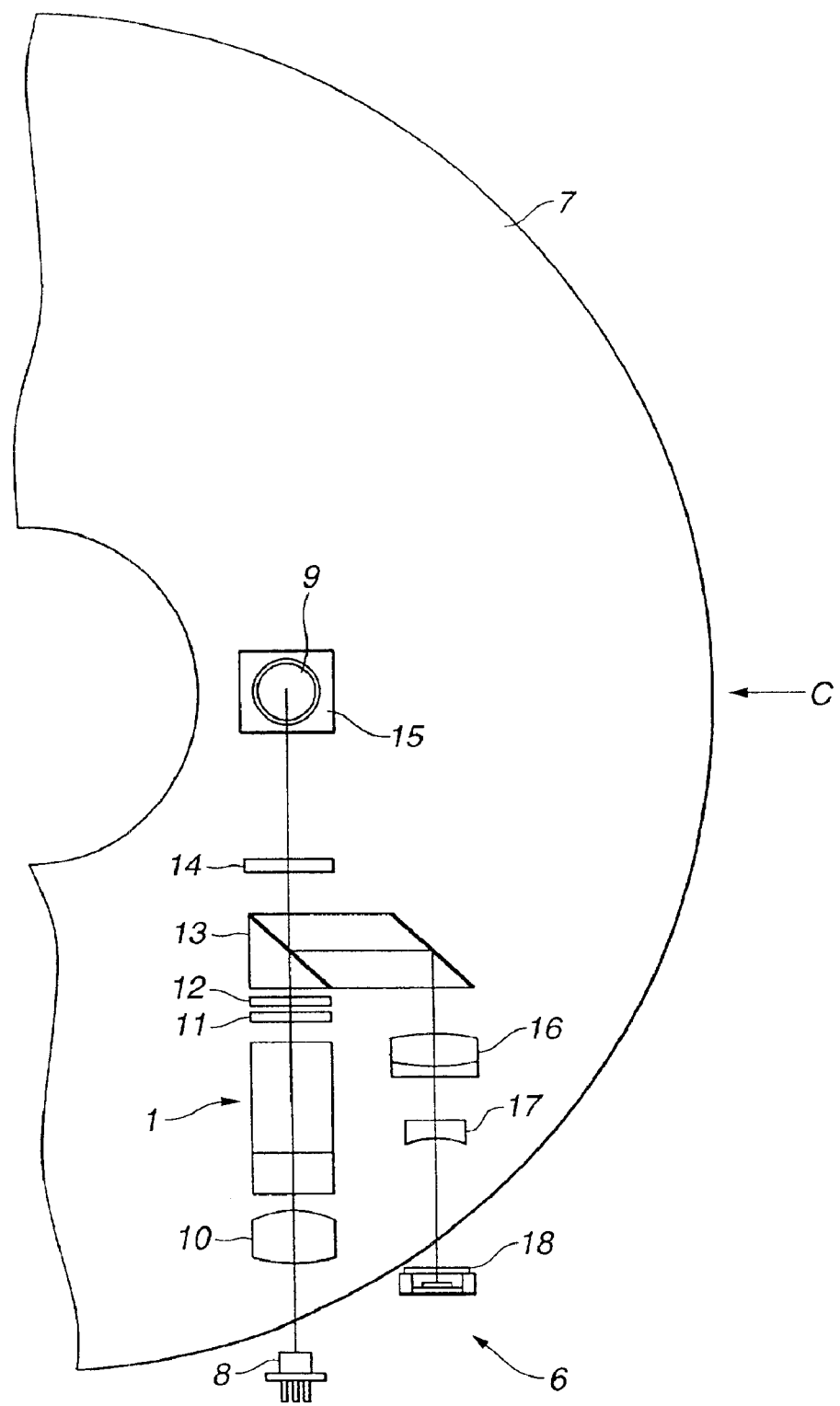
FIG. 15 is a schematic plan view of an embodiment of optical head according to the invention.
Figure 16:
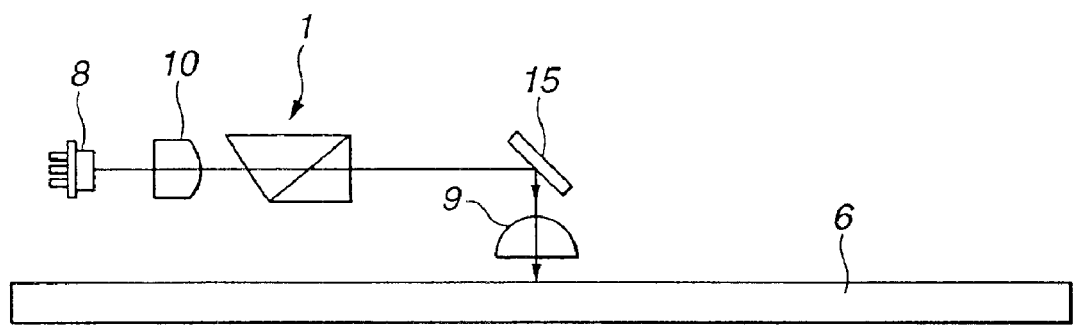
FIG. 16 is a schematic lateral view of the embodiment of FIG. 15 as viewed along arrow C in FIG. 15.

Now, an embodiment of optical head 6 realized by using an anamorphic prism 1 according to the invention will be described below. FIGS. 15 and 16 schematically illustrate an embodiment of optical head 6 according to the invention. FIG. 15 is a schematic plan view of the optical head 6 and FIG. 16 is a schematic lateral view of optical head.

Referring to FIGS. 15 and 16, the optical head 6 comprises a semiconductor laser 8 for emitting a laser beam toward an optical disc for signal recording/reproduction and an objective lens 9 arranged vis-a-vis the optical disc 7 and adapted to converge the laser beam emitted from the semiconductor laser 8 and irradiate the signal recording layer of the optical disc 7 with the converged laser beam. Additionally, a forward collimator lens 10 for collimating the laser beam emitted from the semiconductor laser 8, an anamorphic prism 1 for shaping the signal recording/reproduction laser beam transmitted through the forward collimator lens 10 and correcting the distribution of intensity of light, a half wave plate 11 for shifting the direction of polarization by 90° of the signal recording/reproduction laser beam transmitted through the anamorphic prism 1, a grating 12 for dividing the laser beam whose direction of polarization is shifted by 90° into a main beam and a plurality of auxiliary beams, a polarization beam splitter 13 for transmitting the signal recording/reproduction laser beam transmitted through the grating 12 and reflecting the signal recording/reproduction laser beam (returning beam) reflected by the signal recording layer of the optical disc 7, a ¼ wave plate 14 for circularly polarizing the signal recording/reproduction laser beam transmitted through the polarization beam splitter 13 and a bending mirror 15 for bending the light path of the circularly polarized beam transmitted through the ¼ wave plate 14 by 90° in order to reduce the height of the optical head 6 are arranged between the semiconductor laser 8 and the objective lens 9. The anamorphic prism 1 is the above described embodiment of anamorphic prism according to the invention. The anamorphic prism 1 is adapted to convert the magnification of the laser beam in a direction perpendicular to the main surface of the optical disc. The magnification of conversion of the anamorphic prism 1 as applied to the laser beam is not smaller than 1.4 times.

Additionally, a backward collimator lens 16 for collimating the returning beam reflected by the polarization beam splitter 13, a multi-lens 17 for generating astigmatism to be used for focus servo in the returning beam transmitted through the backward collimator lens 16 and a photodetector 18 for receiving the returning beam transmitted through the multi-lens 17 are arranged on the light path of the returning beam reflected by the polarization beam splitter 13.

It should be noted, however, that the above arrangement of optical head is quoted only as an example that can be realized by applying the present invention and an optical head according to the invention is by no means limited to the above embodiment. One or more than one optical elements may be added, removed or modified depending on the format of the optical disc to be used with it and the method of detecting focus error signals and tracking error signals without departing from the scope of the present invention.

Now, the operation of writing an information signal on and reading an information signal from the optical disc 7 by means of an optical head 6 comprising an anamorphic prism 1 according to the invention and arranged on the light path of the laser beam will be discussed below.

When writing an information signal on the optical disc 7 by means of the optical head 6, firstly a laser beam is emitted from the semiconductor laser with a direction of polarization that produces an S-polarized beam relative to the polarization beam splitter 13 by modulating the intensity of light according to the signal to be recorded under the control of a control section.

The laser beam emitted from the semiconductor laser 8 is collimated by the forward collimator lens 10 as it is transmitted through the latter and then enters the anamorphic prism 1.

The laser beam that enters the anamorphic prism 1 is expanded by 1.9 times in terms of a cross section of the laser beam taken in a direction corresponding to that of θ// and so that the unevenness in the distribution of intensity of light of the laser beam is corrected.

The laser beam that is corrected for the distribution of intensity of light is then made to enter the half wave plate 11, which shifts the direction of polarization of the laser beam by 90°. Subsequently, the laser beam enters the grating 12.

The laser beam entering the grating 12 is divided into a main beam and a plurality of auxiliary beams before entering the polarization beam splitter 13. The laser beam is divided into a main beam and auxiliary beams in order to obtain a tracking error signal.

The polarization beam splitter 13 is arranged to transmit P-polarized light and reflect S-polarized light. Therefore, the laser beam transmitted through the grating 12 is also transmitted through the polarization beam splitter 13 and enters the ¼ wave plate 14.

The laser beam entering the ¼ wave plate 14 is circularly polarized by the latter and its light path is bent by 90° by the bending mirror 15. Then, the laser beam enters the objective lens 9 and converged by the latter before striking the signal recording layer of the optical disc 7.

As the optical head 6 irradiates the signal recording layer of the optical disc 7 with the laser beam in a manner as described above, an amorphous recording mark is formed as information signal in the crystalline recording film of the signal recording layer of the optical disc 7.

The returning laser beam reflected by the signal recording layer of the optical disc 7 is transmitted through the objective lens 9 and its light path is bent by 90° by the bending mirror 15. Then, the laser beam enters the ¼ wave plate 14 and is turned to an S-polarized beam relative to the polarization beam splitter 13.

The S-polarized returning laser beam is then reflected by the polarization beam splitter 13 and collimated by the collimator lens 16 before entering the multi-lens 17.

Then, astigmatism is generated in the returning laser beam that enters the multi-lens 17 in a predetermined manner by the multi-lens 17. Thereafter, the laser beam is received by the photodetector 18.

The returning laser beam received by the photodetector 18 is converted into an electric signal by the photodetector 18, which electric signal is then fed to a signal processing circuit (not shown). The signal processing circuit is adapted to generate a focus error signal and a tracking error signal on the basis of the electric signal fed from the photodetector, which signals are then used to control the operation of recording the signal and the spot of light on the optical disc.

When reading an information signal recorded on the optical disc 7, semiconductor laser 8 of the optical head 6 firstly emits a laser beam with a predetermined intensity.

As in the case of the signal recording operation, the laser beam emitted from the semiconductor laser 8 is transmitted through the forward collimator lens 10, the anamorphic prism 1, the half wave plate 11, the grating 12, the polarization beam splitter 13 and the ¼ wave plate 14 and its direction is bent by the bending mirror 15. Then, the laser beam is converged by the objective lens 9 and irradiated onto the signal recording layer of the optical disc 7.

The optical disc 7 stores information signals typically by a so-called phase change recording method. More specifically, the recording film of the optical disc 2 carries recording marks at positions irradiated by a laser beam so that the crystalline recording film are turned into an amorphous state there. The recording marks shows a reflectivity different from the remaining part of the recording film that is in a crystalline state. Therefore, the information signal recorded on the optical disc 7 can be read by detecting the returning laser beam coming back from the optical disc 7 after irradiating the signal recording layer of the optical disc 7.

The returning light reflected by the signal recording layer of the optical disc 7 is transmitted through the objective lens 9 and its direction is bent by the bending mirror 15. Then, the laser beam enters the ¼ wave plate 14 and is turned into a beam that is S-polarized relative to the polarization beam splitter 13 by the ¼ wave plate 14.

The S-polarized returning beam is then reflected by the polarization beam splitter 13 and collimated by the backward collimator lens 16 before entering the multi-lens 17.

As the returning laser beam enters the multi-lens 17, astigmatism is generated in it in a predetermined manner by the multi-lens 17 and then the returning laser beam is received by the photodetector 18.

The returning laser beam received by the photodetector 18 is converted into an electric signal by the photodetector 18, which electric signal is then fed to a signal processing circuit (not shown). The signal processing circuit is adapted to generate a focus error signal, a servo signal such as a tracking error signal and an RF signal on the basis of the electric signal fed from the photodetector, which signals are then used to control the operation of recording the signal and the spot of light on the optical disc.

As described above, an optical head 6 according to the invention comprises an anamorphic prism 1 also according to the invention, which operates like a conventional anamorphic prism of the type realized without bonding prisms. Therefore, the reduction in the intensity of light can be suppressed more in the radial direction of the optical 7 than in the direction of scanning density of the tracks.

Additionally, since the optical head 6 comprises an anamorphic prism 1 according to the invention, it can eliminate any inclination of the optical axis on the optical path of the laser beam. In other words, the optical head 6 is free from the problem of increased dimensions attributable to an inclined optical axis of anamorphic prism that arises when using a conventional anamorphic prism and hence can be subjected to down-sizing.

Still additionally, since the optical head 6 comprises an anamorphic prism according to the invention, which does not involve any operation of accurately bonding individual components in the course of preparation, it can be prepared with ease to improve the manufacturing efficiency and reduce the manufacturing cost.

Furthermore, since the optical head 6 comprises an anamorphic prism according to the invention, the light beam entering the anamorphic prism 1 is made to parallel to the light beam exiting the anamorphic prism 1. Therefore, the optical head is free from the problem of displacement of conventional anamorphic prisms having an inclined optical axis. In other words, it is free from the adverse effect of the displacement of anamorphic prism in the direction parallel to the proceeding direction of the laser beam so that a high quality optical head can be realized according to the invention. As pointed out above, since the magnification of conversion of the anamorphic prism 1 of the optical head 6 as applied to the light beam is not smaller than 1.4 times, the optical head 6 can enjoy the advantages of the anamorphic prism 1 (in terms of down-sizing the optical head and low manufacturing cost) while it can eliminate any directional unevenness in the distribution of intensity of light in the spot of light formed on the optical disc (as viewed in the direction of the pn junction plane of the semiconductor laser or the direction corresponding to θ// and θ⊥).

Now, another embodiment of anamorphic prism 1 according to the invention will be described by referring to FIGS. 17 and 18. This embodiment of anamorphic prism 1 is a decolorizing anamorphic prism designed for a center wavelength of 405 nm and a wavelength range of ±10 nm selected as design values that shows a variable magnification of conversion and an equal offset value for both the incoming light beam and the outgoing light beam relative to the optical axis. It will be appreciated by seeing the anamorphic prism 1 of FIGS. 17 and 18 that it is possible to realize an anamorphic prism that shows an equal offset value X for both the incoming light beam and the outgoing light beam relative to the optical axis and a variable magnification of conversion β.

Currently, efforts are being paid with little success to develop optical disc devices for practical applications that are adapted to be used with a laser beam having a center wavelength of about 405 nm in order to achieve a higher recording density of optical disc. In other words, no specifications are defined for light sources to be used for such optical disc devices. When a system is developed with undefined specifications and the specifications of a system, if defined, may be subject to change after the sale of the system, it is highly difficult to optimize the magnification of an anamorphic prism adapted to a light source particularly because conventionally anamorphic prisms show an inclination of the optical axis as pointed out above and the inclination varies as a function of the anamorphic magnification so that any change to the magnification of anamorphic prism results in a design change to the base.

Figure 17:
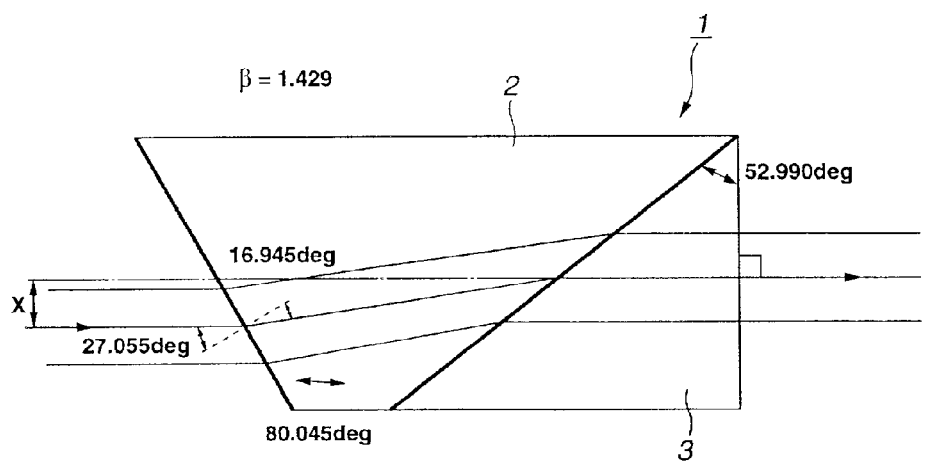
FIG. 17 is a schematic cross sectional view of another embodiment of anamorphic prism according to the invention.
Figure 18:
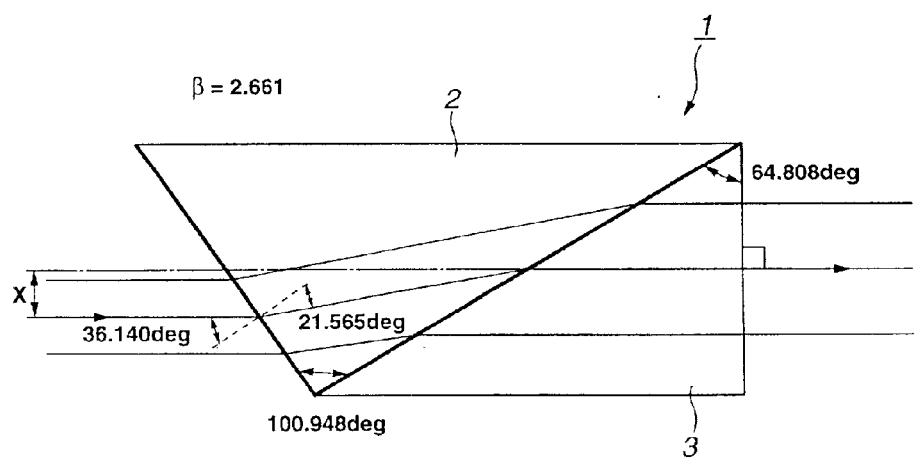
FIG. 18 is a schematic cross sectional view of still another embodiment of anamorphic prism according to the invention.

To the contrary, in an optical head 6 comprising an anamorphic prism 1 according to the invention and adapted to change the magnification as shown in FIGS. 17 and 18, the offset of the incoming light beam and that of the outgoing light beam can be equalized relative to the optical axis so as to provide common specifications to the base. In other words, the base does not need any design change if the magnification of the anamorphic prism 1 is modified. Then, not only the magnification of the anamorphic prism 1 can be modified with an enhanced degree of freedom and but also it is possible to combine a semiconductor laser and an anamorphic prism appropriately depending on the characteristics of the semiconductor laser. Thus, it is now possible to produce an optical head showing desired characteristics by using a semiconductor laser having a wide applicability in terms of its performance. Additionally, since the offset of the incoming light beam from the optical axis can be made equal to that of the outgoing light beam, the anamorphic prism 1 can be made to show an optimal length.

Figure 19:
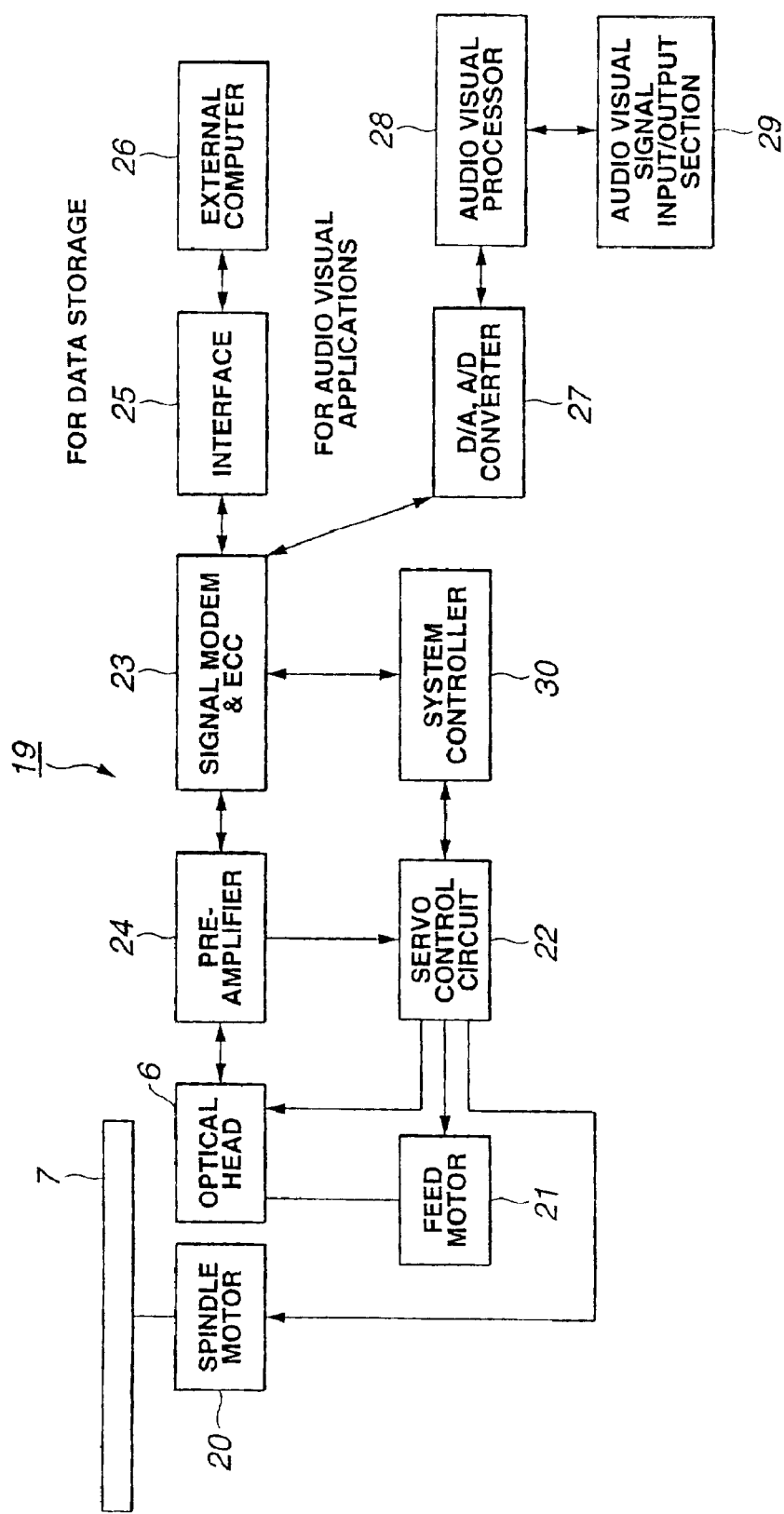
FIG. 19 is a schematic block diagram of an embodiment of optical recording/reproduction device according to the invention.

Now, an embodiment of optical recording/reproduction device comprising an optical head according to the invention will be described below. FIG. 19 is a schematic block diagram of the embodiment.

Referring to FIG. 19, the embodiment of optical recording/reproduction device 19 comprises an disc device and an optical disc. The disc device comprises a spindle motor 20 for driving the optical disc 7 to rotate, an optical head and a feed motor 21 for driving the optical head.

While the optical disc 7 may be a Pit disc dedicated to signal reproduction, the use of a recording/reproduction disc such as CD-R/RW, DVD-R, DVD-RAM, DVD-R/RW, DVD+RW or a high density optical disc adapted to use with a short wave light source with a wavelength of about 405 nm will be more effective for the purpose of the invention.

The spindle motor 20 is controlled for its operation by a system controller 30 and a servo control circuit 22 and adapted to drive the optical disc to rotate with a predetermined number of revolutions per unit time.

The optical head 6 is an optical head according to the invention.

Said optical head 6 is connected to a feed motor for driving the optical head to a predetermined recording track on the optical disc 7. The spindle motor 20, the feed motor 21 and the focussing direction and the tracking direction of the biaxial actuator (not shown) for holding the objective lens of the optical head are controlled by a servo control circuits 22.

The signal modulator and ECC block 23 is used to modulate/demodulate signals and add an error correction code (ECC) to the signal to be recorded. The optical head 6 detects the light beam reflected from the signal recording surface of the optical disc 7 and feeds the signal corresponding to the light beam to the pre-amplifier 24.

The pre-amplifier 24 is designed to generate a focus error signal, a tracking error signal and an RF signal on the basis of the signal corresponding to the detected light beam. Predetermined processing operations such as demodulation and error correction are performed by the servo control circuit 22 and the signal modulator and ECC block 23 on the basis of these signals and depending on the type of the recording medium from which signals are reproduced.

The recorded signal that is demodulated may be then sent to an external computer by way of interface 25 if the recording medium is a data storage of the computer. Thus, the external computer 26 receives the signal recorded on and reproduced from the optical disc 7.

If, on the other hand, the recording medium is used for storing audio visual signals, the reproduced signal is subjected to digital/analog conversion by the D/A converting section of the D/A, A/D converter 27 and fed to the audio visual processing scanning 28 that processes the reproduced audio visual signal and transmits it to an external imaging device/projector by way of the audio visual signal input/output section 29.

While an anamorphic prism according to the invention is described in terms of possible applications of optical discs, it is by no means limited to the above description and may be used for various different applications including cameras as in the case of conventional anamorphic prisms. Then, it is possible to down-size and reduce the cost of the wide view angle camera comprising such an anamorphic prism and adapted to use a film or a CCD for recording.

Since an optical recording/reproduction device 19 according to the invention comprises an optical head 6 according to the invention, which by turn comprises an anamorphic prism 1 also according to the invention that operates like a conventional anamorphic prism of the type realized without bonding prisms, the reduction in the intensity of light can be suppressed more in the radial direction of the optical disc 7 than in the direction of scanning density of the tracks.

Since an optical recording/reproduction device 19 according to the invention comprises an optical head according to the invention, it is free from the problem of increased dimensions attributable to an inclined optical axis on the optical path of the laser beam and hence can be subjected to down-sizing of the optical head.

Additionally, since an optical recording/reproduction device 19 according to the invention comprises such an optical head 6, it can be manufactured at low cost with an enhanced manufacturing efficiency.

Additionally, since an optical recording/reproduction device 19 according to the invention comprises such an optical head 6, comprises an anamorphic prism 1, it is free from the problem of displacement of conventional anamorphic prisms having an inclined optical axis. In other words, it is free from the adverse effect of the displacement of anamorphic prism in the direction parallel to the proceeding direction of the laser beam so that a high quality optical head can be realized according to the invention.

What is claimed is:

1. An anamorphic prism typically adapted to compress or expand the incident light beam in a particular direction of cross section of the light beam before letting it exit therefrom, said anamorphic prism comprising:

a first prism made of a first light transmitting material;

a second prism made of a second light transmitting material;

said first prism and said second prism being bonded together along predetermined respective planes thereof;

the light beam entering said first prism being expanded or compressed in a particular direction of cross section of the beam with a predetermined magnification; and the expanded or compressed light beam being let to exit from said second prism such that the direction of propagation of the light beam exiting said second prism is substantially parallel to the direction of propagation of the light beam entering said first prism.

2. The anamorphic prism according to claim 1, wherein the magnification of conversion at the cross section of the incoming light beam along the junction plane of the first prism and the second prism is greater than the magnification of conversion at the cross section of the incoming light beam along the refraction plane of the first prism or the second prism different from said junction plane.

3. The anamorphic prism according to clam 1, wherein, if the refractive index of the first light transmitting material and that of the second light transmitting material relative to a predetermined wavelength is N1 and N2 respectively and the change in the refractive index of the first vitreous material an the change in the refractive index of the second vitreous material relative to the change in the wavelength are $\Delta N1$ and $\Delta N2$ respectively, the requirement of the formula below is satisfied $$0.7 (\Delta N2/\Delta N1) \times (N1/N2)^2 \leq 1.4.$$

4. The anamorphic prism according to claim 1, wherein a reflection plane is provided on the plane through which the light beam exits said second prism and the proceeding direction of the outgoing light beam is made to be substantially perpendicular to the proceeding direction of the outgoing light beam entering the first prism by said reflection plane.

5. An optical head adapted to direct the light beam from a light source to an optical recording medium, said optical head comprising:

an anamorphic prism for converting the light beam emitted from the light source in a particular direction of cross section of the light beam:

an objective lens for converging the light beam emitted from said anamorphic prism and irradiating an optical recording medium with the light beam; and an photodetector for receiving the light beam reflect by and returning from said optical recording medium;

said anamorphic prism having:

a first prism made of a first light transmitting material; and a second prism made of a second light transmitting material;

said first prism and said second prism being bonded together along predetermined respective planes thereof;

the light beam entering said first prism being expanded or compressed in a particular direction of cross section of the light beam with a predetermined magnification; and the expanded or compressed light beam being let to exit from said second prism such that the direction of propagation of the light beam exiting said second prism is substantially parallel to the direction of propagation of the light beam entering said first prism.

6. The optical head according to claim 5, wherein said anamorphic prism is adapted to expand or compress the light beam emitted from said light source with a predetermined magnification in a direction perpendicular to the main surface of the optical recording medium.

7. The optical head according to claim 5, wherein the components other than said anamorphic prism are arranged at respective positions that makes the offset of the incoming light beam and that of the outgoing light beam from the optical axis are substantially equal and allows to be used in combination with a plurality of anamorphic prisms showing different respective magnifications of conversion relative to the incoming light beam.

8. The optical head according to claim 5, wherein said anamorphic prism converts the light beam emitted from said light source with magnification of conversion not smaller than 1.4 times.

9. An optical recording/reproduction device for optically recording an information signal on and reproducing an information signal from the signal recording surface of an optical recording medium, said device comprising:

an optical head including:

a light source;

an anamorphic prism for converting the light beam emitted from the light source in a particular direction of cross section of the light beam;

an objective lens for converging the light beam emitted from said anamorphic prism and irradiating an optical recording medium with the light beam; and an photodetector for receiving the light beam reflected by and returning from said optical recording medium;

a signal processing circuit for processing the detection signal from said optical head; and a control means for controlling the operation of said optical head according to the output of said signal processing circuit;

said anamorphic prism having:

a first prism made of a first light transmitting material; and a second prism made of a second light transmitting material;

said first prism and said second prism being bonded together along predetermined respective planes thereof;

the light beam entering said first prism being expanded or compressed in a particular direction of cross section of the beam with a predetermined magnification;

the expanded or compressed light beam being let to exit from said second prism such that the direction of propagation of the light beam exiting said second prism is substantially parallel to the direction of propagation of the light beam entering said first prism.

* * * * *